(12) United States Patent  
Brittenham

(10) Patent No.: US 7,251,090 B2
(45) Date of Patent: Jul. 31, 2007

(54) PATTERN DEPENDENT WRITE EQUALIZATION

(75) Inventor: Steven L Brittenham, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/106,177

(22) Filed: Apr. 13, 2005

(65) Prior Publication Data

US 2006/0232870 A1 Oct. 19, 2006

(51) Int. Cl.
*G11B 5/035* (2006.01)

(52) U.S. Cl. .............................. 360/65; 360/46; 360/51; 360/25

(58) Field of Classification Search ...................... None
See application file for complete search history.

(56) References Cited

U.S. PATENT DOCUMENTS

| | | | |
|---|---|---|---|
| 5,255,130 A | 10/1993 | Buchan et al. | |
| 5,339,202 A * | 8/1994 | Heinz et al. | 360/46 |
| 5,638,226 A * | 6/1997 | Koren | 360/40 |
| 5,754,593 A | 5/1998 | Koren | |
| 5,774,505 A | 6/1998 | Baugh | |
| 5,872,665 A | 2/1999 | Millican et al. | |
| 6,055,117 A * | 4/2000 | Hansen et al. | 360/45 |
| 6,212,249 B1 * | 4/2001 | Shin | 375/376 |
| 6,678,105 B2 * | 1/2004 | Melas | 360/45 |
| 6,819,514 B1 * | 11/2004 | Behrens et al. | 360/65 |
| 6,831,797 B2 | 12/2004 | Koller et al. | |
| 2003/0048564 A1 | 3/2003 | Koller et al. | |
| 2004/0168024 A1 | 8/2004 | Buckingham | |
| 2005/0169412 A1 * | 8/2005 | Yang et al. | 375/350 |

OTHER PUBLICATIONS

Oklobdzija, Vojin G. *Circuit Implementation Techniques For the Magnetic Read/Write Channels*. Jan. 2000.

Schneider, Richard C. *Write Equalization In High-Linear-Density Magnetic Recording*. Nov. IBM J. Res. Develop., Nov. 1985, pp. 563-568, vol. 29, No. 6.

*HP Storage Works Ultrium 960 Tape Drive Technical White Paper*. Dec. 2004, pp. 1-19.

* cited by examiner

*Primary Examiner*—Tan Dinh
*Assistant Examiner*—Dismery Mercedes

(57) ABSTRACT

A pattern dependent write equalization method is disclosed. The method includes identifying a trait of a data pattern in a stream of write data. A characteristic of a write equalization signal is then defined according to the identified trait for the data pattern.

27 Claims, 8 Drawing Sheets

PATTERN DEPENDENT WRITE EQUALIZATION

Binary data is stored on magnetic media by magnetizing small areas of the magnetic surface with one of two polarities. When writing data, a write system passes a write current through an inductive head. A write current in one direction through the head sets the polarity of the media adjacent to the head to one polarity; a reverse in current direction sets the opposite polarity. The transition between polarities is called a flux transition. A flux transition occurring at a data bit location may represent a one bit, and a no flux transition may represent a zero bit. The opposite may instead be true. A flux transition occurring at a data bit location may represent a zero bit, and a no flux transition may represent a one bit. More generally, a flux transition occurring at a data bit location represents a transition bit which may be a one bit or a zero bit. The absence of a flux transition at a data bit location represents a non-transition bit. Data bits as described here, depending on the encoding scheme used, may or may not map into actual customer data bits.

In one example of a magnetic mass storage system implementation, previously written media is passed under a magneto-resistive (MR) head. The resistance of the head varies as the magnetic flux changes when passing over the alternating magnetic fields of the previously recorded small magnetized areas. A constant current is passed through the head, converting resistance changes to voltage variations. Thus, the flux transitions are converted into voltage pulses, so that the information in a resulting read signal is encoded in the temporal spacing of pulse peaks. A pulse is a single vibration of voltage or current in a signal. The read system samples pulse sequences to decode the corresponding binary data.

To help shape the pulses for the read-back system, the write system can add write equalization pulses to the write current. Write equalization pulses occur at a faster rate than that at which the transition bits are written. One use of the write equalization pulses is to "AC-erase" the media between largely separated pulses, preventing saturation of the MR head and providing lossless slimming of the read-back pulse shape. Accordingly, write equalization pulses typically are added for relatively sparse patterns of the binary data and not for relatively dense patterns. As an example, a sparse pattern could be a single or a sequence of two, three or four or more consecutive non-transition bits. A dense pattern could be a single or a consecutive sequence of two, three, or four or more consecutive transition bits.

The read-back system assumes linearity across the writing and subsequent readback process. Write equalization attempts to maintain linearity by eliminating saturation of the readback head over sparser patterns. However, the traditional writing technique in which write equalization pulses are either turned on or turned off depending on the sparseness of a bit sequence is in itself decidedly non-linear. This inherent non-linearity has the potential of causing read errors, especially at the boundaries between areas of a magnetic medium encoded using write equalized and non-write equalized write signals. Providing a means for varying the amount of write equalization as a function of the sparseness of a bit sequence, as an example, can make the process more linear.

DRAWINGS

Figure 6:
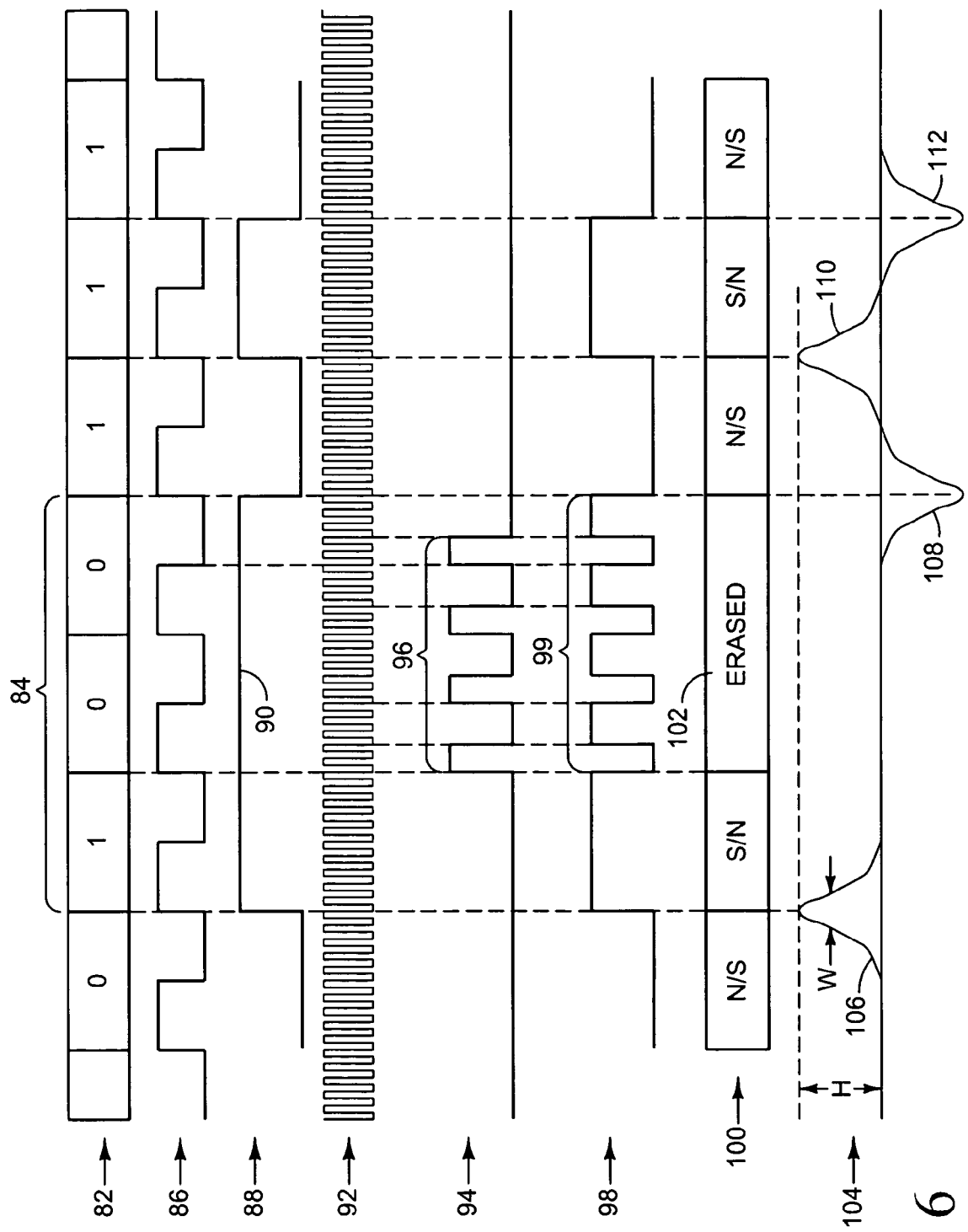

FIG. 6 illustrates an exemplary write data sequence, an exemplary write clock signal, an exemplary write signal generated according to the write data sequence, an exemplary write equalization clock signal, an exemplary write equalization signal generated according to the write data sequence, a combination of the write signal and the write equalization signal, the exemplary magnetization of magnetic media based on the combined signal, and an exemplary read signal taken from the magnetic media.

Figure 7:
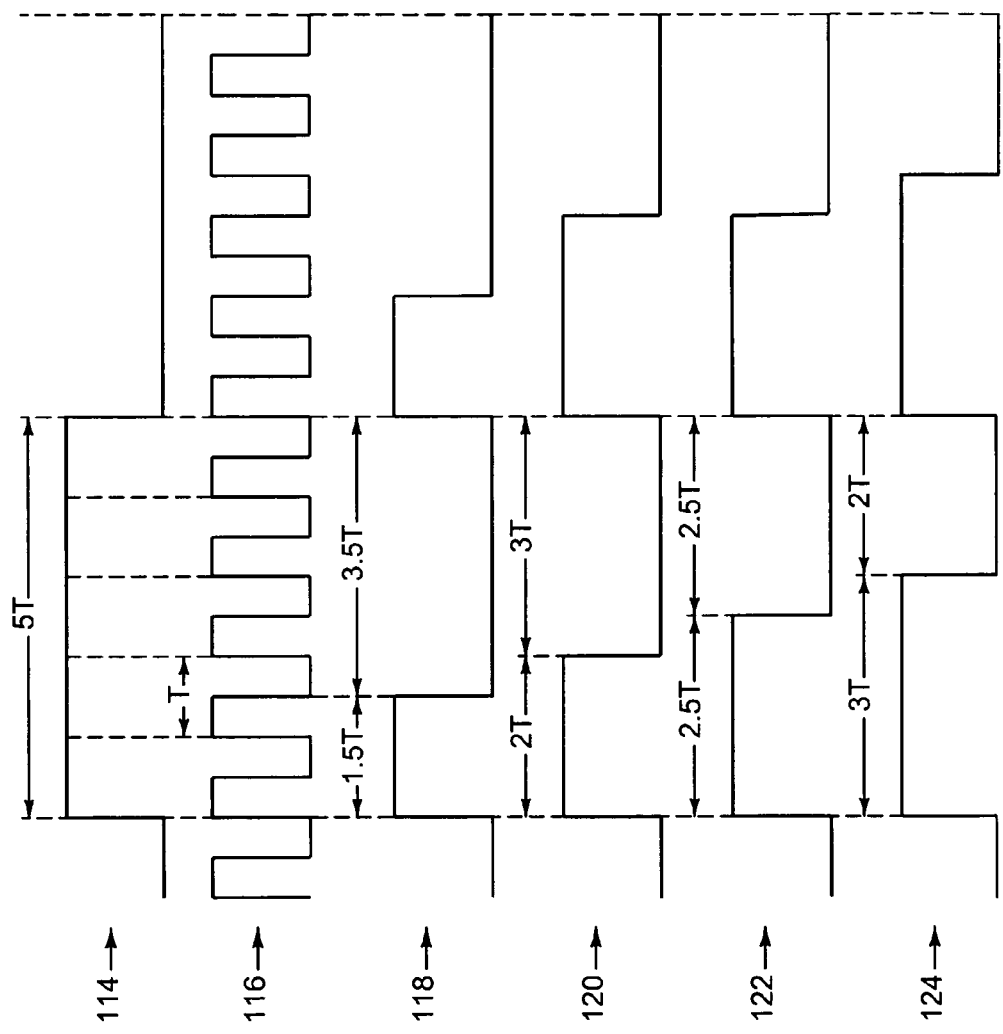

FIG. 7 illustrates an exemplary write clock signal, an exemplary write equalization clock signal, and various write equalization signals having variously shaped write equalization pulses.

Figure 8:
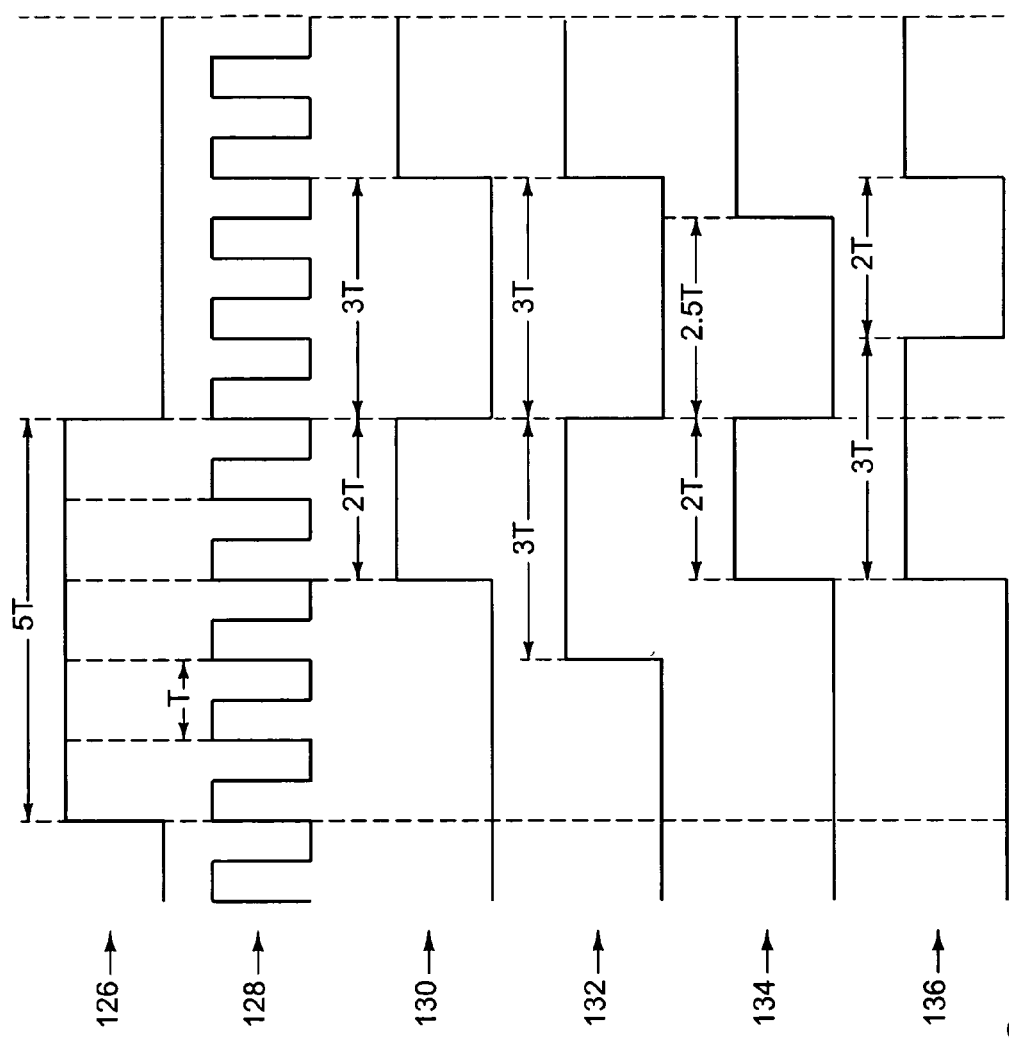

FIG. 8 illustrates an exemplary write clock signal, an exemplary write equalization clock signal, and various write equalization signals having variously shaped and timed write equalization pulses.

Figure 9:
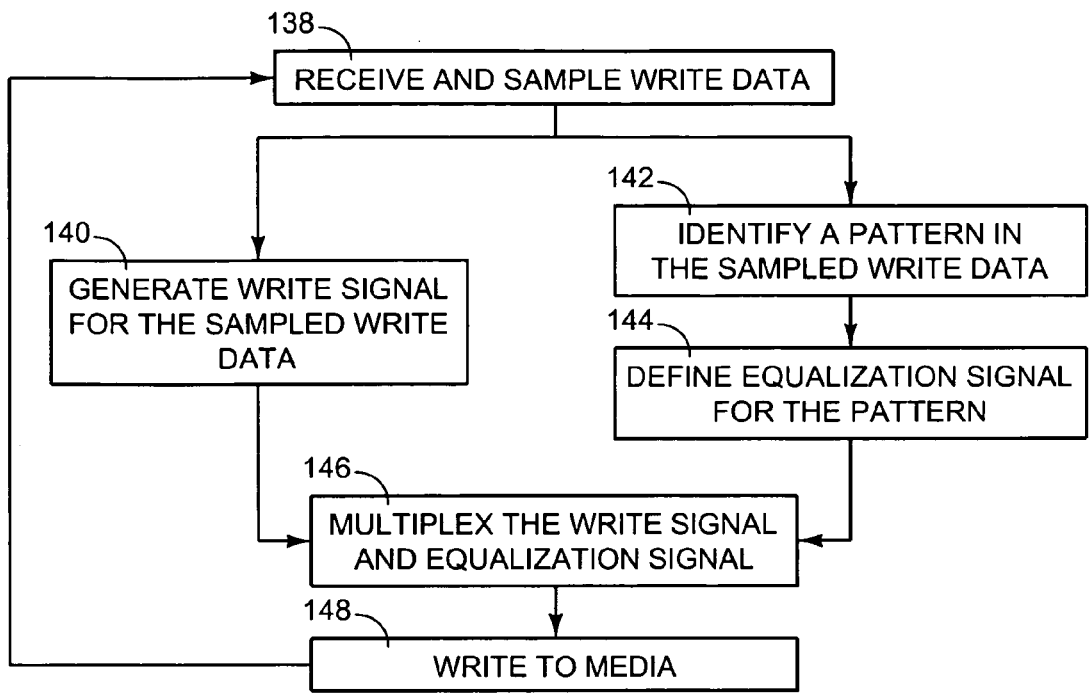
Figure 10:
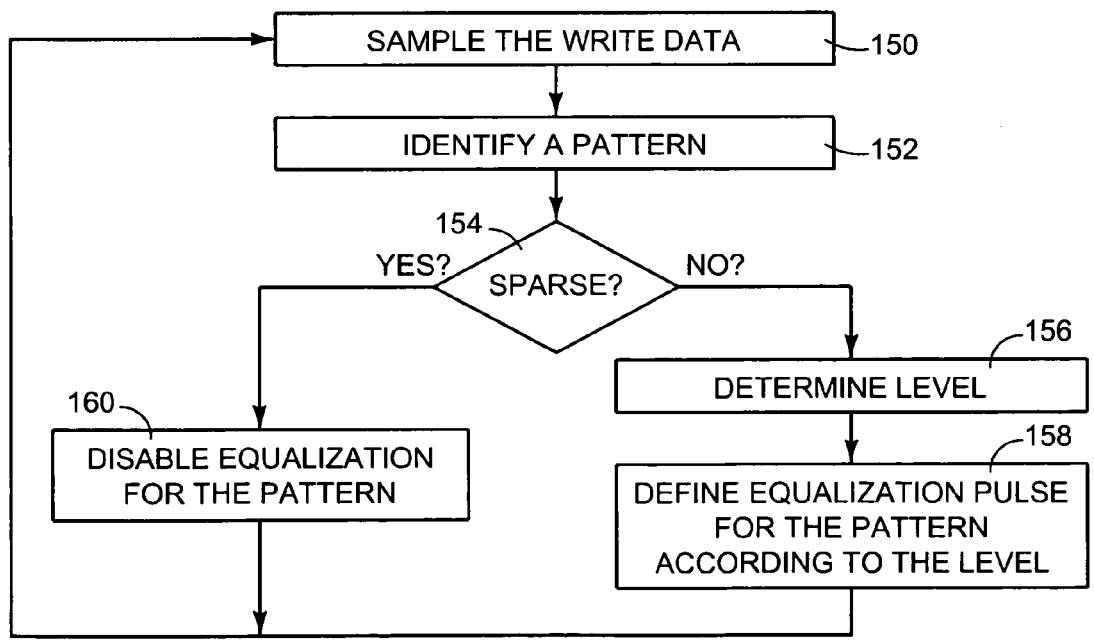

FIGS. 9 and 10 are exemplary flow diagrams illustrating steps taken to implement various embodiments of the present invention.

DETAILED DESCRIPTION

INTRODUCTION: When writing data to magnetic media, write equalization is used to shape the voltage pulses for the read-back system. Typically, write equalization is either turned on or off—a decidedly non-linear approach. Because the read-back system assumes linearity, a non-linear approach to write equalization can have some undesirable results. Various embodiments described below add a level of linearity to write equalization.

The following description is broken into sections. The first section labeled "Magnetic Media" describes an exemplary magnetic media drive and the manner in which the drive encodes data. The second section labeled "Write Equalization" describes the function of write equalization. The third section labeled "Pattern Dependence" describes various implementations where the manner in which write equalization is implemented is dependent upon patterns identified in the data being written to the magnetic media.

Figure 1:
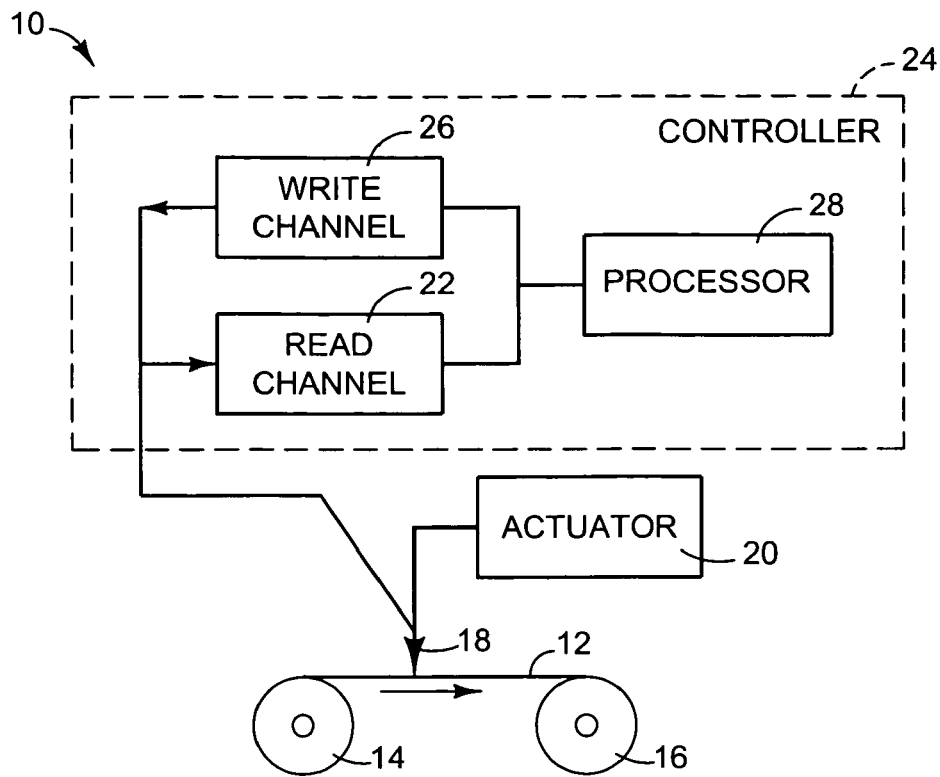
FIG. 1 is a simplified block diagram of principal portions of a typical magnetic tape drive associated with the reading and writing of data.

MAGNETIC MEDIA: FIG. 1 illustrates an exemplary magnetic media drive's read/write components 10 in which embodiments of the present invention may be implemented. Implementation, however, are not limited to use with tape drives. Embodiments may be implemented in other magnetic storage products such as hard disks, as well as optical drive applications.

Media drive 10 reads from and writes to magnetic tape 12 which is fed from supply reel 14 to take-up reel 16 along a tape path passing by read/write head 18. Actuator 20 positions head 18 over magnetic tape 12 to read from or write on specific tracks (stripes) down the tape 12. During a read operation, signals pass from head 18 to read channel 22 located on controller 24. During a write operation, signals pass from write channel 26 to head 18. Controller 24, which includes a processor 28, controls the operation of the tape drive, including reels 14 and 16, actuator 20, read channel 22 and write channel 26. Controller 24 receives read instructions, write instructions, and data from a computer or other host.

Although only one head 18 and associated read channel 22 and write channel 26 are shown, typical magnetic media can have multiple tracks, and such tape drives will usually have an array of many such heads formed in a composite head structure. The controller will include a read channel and a write channel for each head in the array. In some tape drives, separate read heads and write heads are used instead of combined read and write heads.

Figure 2:
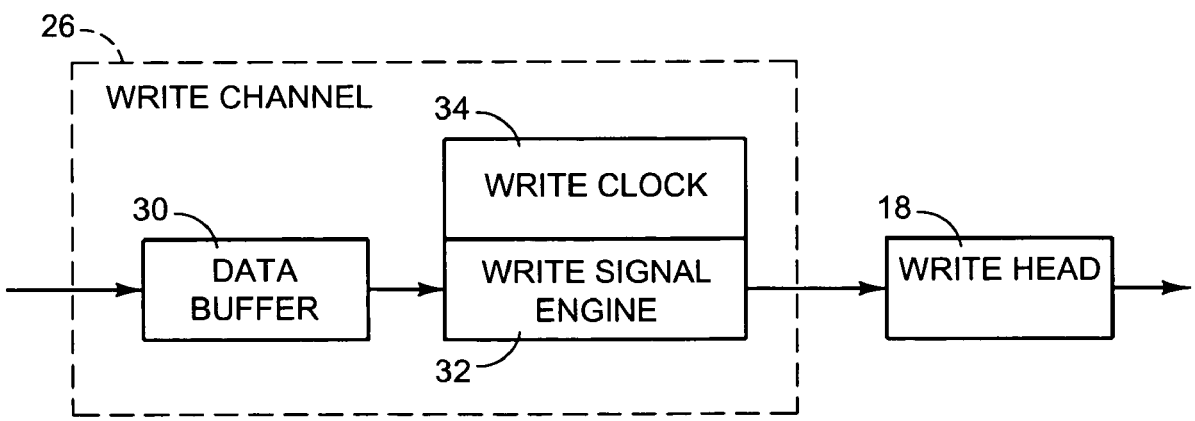
FIG. 2 is a simplified block diagram of one implementation of a write channel.

Moving to FIG. 2, an exemplary write channel 26 is shown to include data buffer 30, write signal engine 32, and write clock 34. Data buffer 30 represents generally any suitable hardware serving as a temporary storage for data to be written—write data. Write signal engine 32 represents generally any combination of hardware and/or programming capable of generating a write signal corresponding to write data sampled from data buffer 30. A write signal is a signal generated to cause write head 18 to encode magnetic media with write data. For example, a write signal may be a write current in which a transition or reverse in current direction through write head 18 may represent a one bit and the absence of a transition may represent a zero bit.

Alternatively, a transition or reverse in current direction through write head 18 could represents a zero bit and the absence of a transition at a data bit location could represents a one bit. More generally, the bit represented by a transition in a write signal can be referred to as a transition bit as opposed to a non-transition bit. In the examples that follow, one bits are shown to be transition bits, but zero bits could just as easily be transition bits with the one bits being non-transition bits.

Write clock 34 represents any combination of hardware and/or programming suitable for providing a write clock signal to write signal engine 32. The write clock signal sets the timing of any transitions in the write signal. Without write equalization, the write clock generally represents the resolution of possible transition spacings allowed on the storage medium. With write equalization, the write clock is generally a multiple of the possible transition spacings, allowing for the writing of pulses at rates too fast for the storage medium to resolve.

Figure 3:
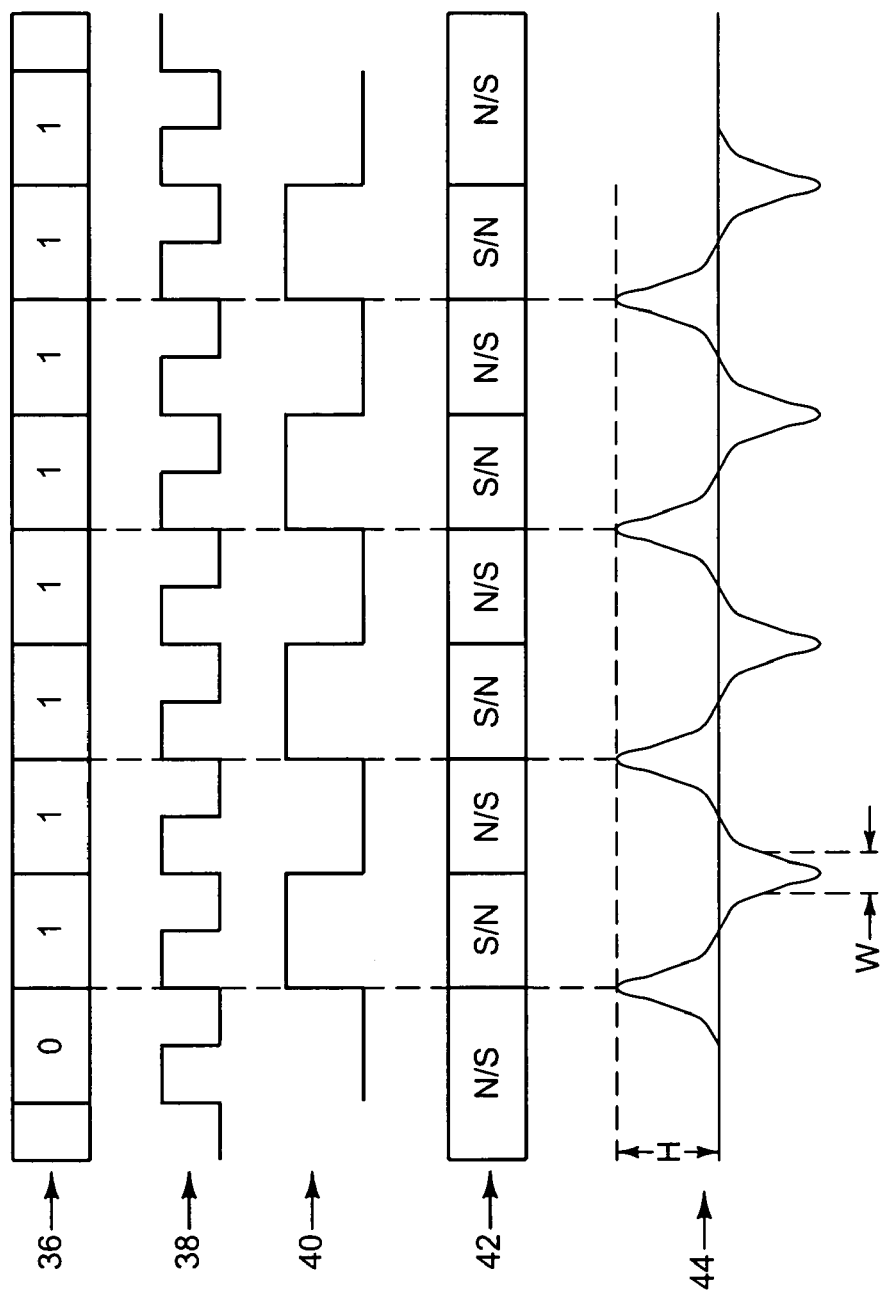
FIG. 3 illustrates an exemplary write data sequence, an exemplary write clock signal, an exemplary write signal, the exemplary magnetization of magnetic media based on the write signal, and an exemplary read signal taken from the magnetic media.

FIG. 3 illustrates an example of a stream of write data 36, a write clock signal 38, a corresponding write signal 40, magnetic media 42, and a read signal 44. Write data 36, read from left to right, represents a stream of binary data to be encoded on magnetic media 42. Here, a transition occurs in write signal 40 for each transition bit—in this example, for each one bit. Each transition occurs on a rising edge of write clock signal 38 and results in a change in polarity of the magnetic fields encoded on magnetic media 42. Consequently, sequential areas of magnetic media 42 are encoded with alternating and opposing magnetic fields. The transition from one field to another results from a transition of write signal 40. In the examples shown, "N/S" represents a relative North-to-South polarization while "S/N" represents a South-to-North polarization.

When a magneto-resistive head is used to read magnetic media 42, a read signal 44 is generated that includes a series of pulses. Each pulse in read signal 44 represents a transition from one magnetic field to another as detected by the head. With the relatively high and consistent frequency of transitions in the polarization of magnetic media 42, the height "H" and width "W" of the read signal pulses are generally uniform, allowing the read signal to be more easily translated into a form corresponding to write data 36.

Figure 4:
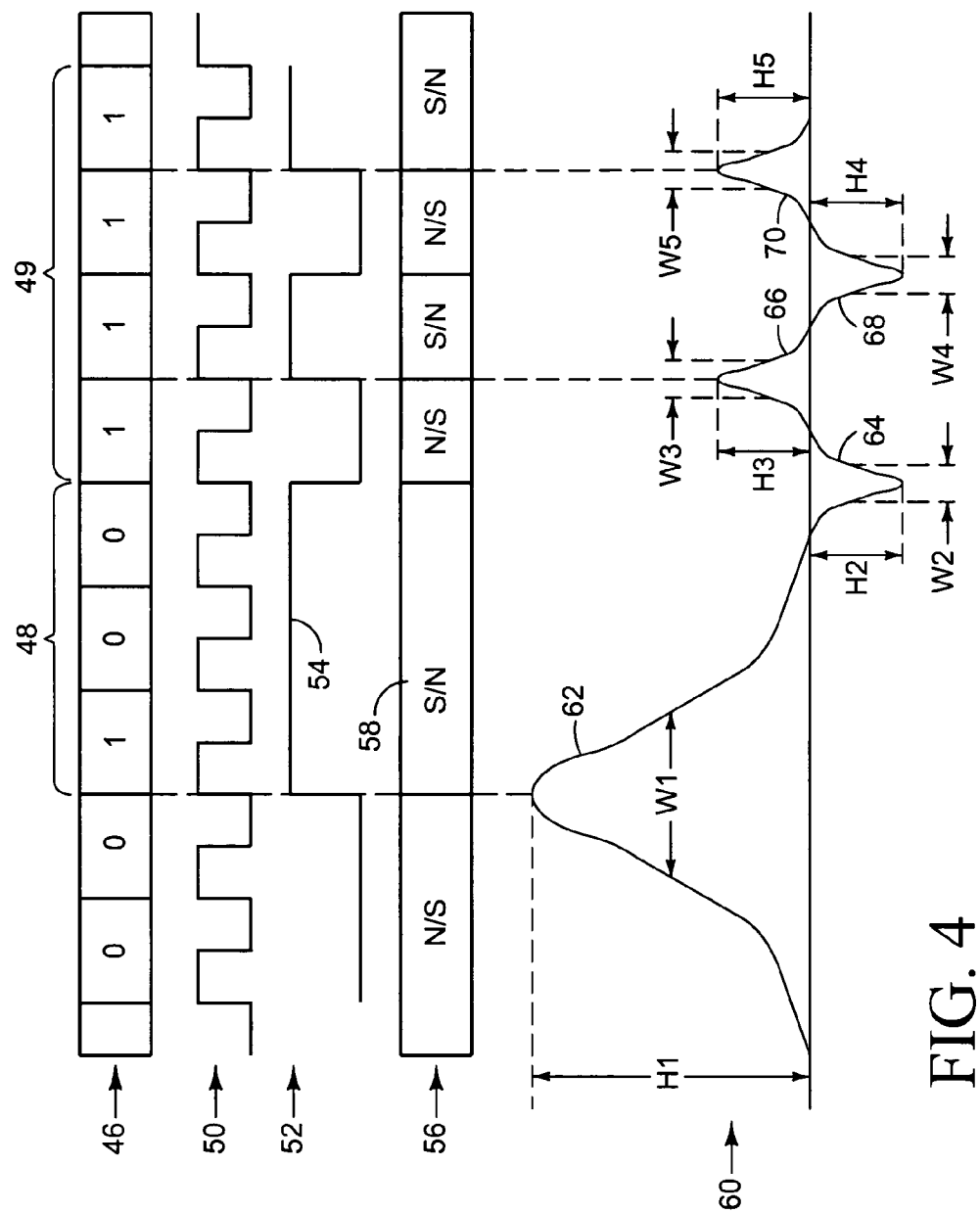
FIG. 4 illustrates an exemplary write data sequence, an exemplary write clock signal, an exemplary write signal, the exemplary magnetization of magnetic media based on the write signal, and an exemplary read signal taken from the magnetic media.

Sparser (more widely separated) polarization of magnetic media can create undesirable non-linear pulse characteristics in a read signal, as illustrated in FIG. 4. A stream of write data 46 containing a relatively sparse data pattern 48 and a relatively high density data pattern 49, a write clock signal 50, and a write signal 52 corresponding to write data 46. Again, in this example, a transition in write signal 52 occurs for each one bit in write data 46 with each transition occurring on a rising edge of write clock signal 50. Having only a single transition bit (a one bit at the beginning followed by three zero bits in this example), sparse pattern 48 creates a relatively long, low-frequency pulse 54 in write signal 52. Pulse 54 can be said to represent a relatively long duration of non-transition in write signal 52. High density pattern 49 of write data 46 includes a consecutive series of transition bits and creates a series of relatively short, high frequency pulses 55. Each of the pulses in 55 can be said to be a relatively short duration of non-transition of write signal 52.

Sequential areas of magnetic media 56 are encoded with alternating and opposing magnetic fields. The transition from one field to another results from a transition of write signal 52. The relatively large size of pulse 54 creates an area 58 on magnetic media 56 with a relatively low frequency in the transition between differing magnetic fields. The relatively small size of pulses 55 creates an area 59 on magnetic media 56 with a relatively high frequency in the transition between differing magnetic fields.

When a magneto-resistive head is used to read magnetic media 56, a read signal 60 is generated that includes a series of pulses 62–72 each representing a transition from one magnetic field to another as detected by the head. Pulse 62 results from the relatively low frequency transition in magnetic field from "N/S" to "S/N" in area 58 of magnetic media 56. Pulses 64–72 result from the relatively high frequency transitions between opposing magnetic fields in area 59 of magnetic media 56. The relatively low frequency of transitions in area 58 saturates the magneto resistive head, increasing the height (H1) and width (W1) of pulse 62. The relatively high frequency of transitions in area 59 results in pulses having generally uniform heights (H2–H5) and widths (W1–W5).

Most read channels require linearity in the readback signal to effectively recover the originally written data. Any saturation in the readback of pulse 62 compared to pulses 64–72 makes read signal 60 difficult to translate into a form corresponding to write data 46.

WRITE EQUALIZATION: A process referred to as write equalization is used to help properly shape the read signal where sparse patterns in the write data would otherwise cause saturation in the read signal. Moving to FIG. 5, an exemplary write channel 26' is shown to include data buffer 30, write signal engine 32, and write clock 34 as well as equalization engine 76, equalization clock 78, and multiplexer 80. It is noted that write signal engine 32 and write clock 34, equalization engine 76 and equalization clock 78, and multiplexer 80 can be implemented in a single hardware block to create a combined engine capable of properly encoding write-and non write-equalized clock and data pulses.

Equalization engine 76 represents generally any combination of hardware and/or programming capable of generating a write equalization signal having one or more characteristics defined by a trait of a data pattern sampled from data buffer 30. Equalization clock 78 represents generally any combination of hardware and/or programming suitable for providing a write equalization clock signal to equalization engine 76. Multiplexer 80 represents generally any combination of hardware and/or programming capable of combining the write signal and the write equalization signal into a common signal to be sent to write head 18.

A write equalization signal is a series of selectively timed and shaped pulses at a frequency too high for magnetic media to respond. In other words, instead of magnetizing areas of the magnetic media, the write equalization pulses act to erase the magnetic media. As discussed below, equalization engine 76 times and shapes the write equalization pulses based on patterns in the write data sampled from data buffer 30.

For dense patterns, the write equalization signal may have no pulses. In other words, write equalization may be turned off. A dense pattern, for example, could be a single or a consecutive sequence of two, three, or four or more consecutive transition bits. But instead of simply turning write equalization on for sparse patterns (as has been done in prior implementations), equalization engine 76 differentiates among levels of sparseness and times and shapes equalization pulses accordingly. For example, a single non-transition bit may be at a first level of sparseness, two consecutive non-transition bits may be at a second level, three consecutive non-transition bits may be at a third level, and so on.

Equalization engine 76 defines characteristics of the write equalization signal based on an identifiable trait of a data pattern. In the examples described, that trait is a level of sparseness of the data pattern. In doing so, equalization engine 76 may utilize a look-up table, algorithm, or other suitable method for correlating a particular level of sparseness with a characteristic or characteristics of the write equalization signal to be used. For example, upon identifying a sparseness level "A," equalization engine 76 may use a look-up table or algorithm to look-up or calculate a characteristic or characteristics "B." As described below, a write equalization signal includes one or more write equalization pulses. Characteristics of the write equalization signal can include the shape and timing of the write equalization pulses. The aforementioned approach was illustrated in mitigating non-linearities from saturation of the magneto resistive readback element caused by the sparser patterns; however, said approach could also be used to mitigate other individual non-linearities or any combination of multiple non-linearities.

In the example above, write equalization engine 76 was described to be responsible for generating a write equalization signal corresponding to a data pattern by sampling the write data in data buffer 30. Alternatively, write equalization engine 76 may generate a write equalization signal corresponding to a data pattern by identifying a trait in the write signal. Such traits can include a duration of non-transition in the write signal—the extent of the duration corresponding to a discernable number of consecutive non-transition bits in the write data. The same trait in the write signal can be characterized by the temporal spacing between pulses in the write signal.

FIG. 6 provides an example of the effects of write equalization while FIGS. 7 and 8 provide examples of variably shaped and timed write equalization pulses. FIG. 6 illustrates a stream of write data 82 containing a relatively sparse data pattern 84, a write clock signal 86, and a write signal 88 corresponding to write data 82. As before, a transition in write signal 88 occurs for each one bit in write data 82 with each transition occurring on a rising edge of write clock signal 86. Having only a single transition bit (a one bit in this example), sparse pattern 84 creates a relatively long, low-frequency pulse 90 in write signal 88.

FIG. 6 also shows equalization clock signal 92. In the example shown, the frequency of equalization clock signal 92 is ten times that of write clock signal 86. It is noted that the actual multiplier between equalization clock signal 92 and write clock signal 86 may be dependent on the resolution of the final write equalization edges illustrated by write equalization 94 and can be any linear or fractional multiple of write clock signal 86, depending on the particular implementation. Write equalization signal 94 contains pulses 96 timed to correspond with the non-transition or zero bits of sparse data pattern 84. The shape of write equalization pulses 96 can be described by their duty cycle. Each pulse 96 has a duty cycle selected as a function of equalization clock signal 92. As shown, that duty cycle is ⅖. In other words, each pulse 96 is at a high state for two periods of equalization clock signal 92 and at a low state for three periods of equalization clock signal 92. The duty cycle indicates that write equalization pulses 96 are at a high state two-fifths of the time.

Multiplexing write signal 88 and write equalization signal 94 results in combined signal 98. Here, write equalization signal 94 has been subtracted from write signal 88. As a result, write equalization pulses 99, which are inverted counterparts to write equalization pulses 96, shorten low frequency pulse 90 into a higher frequency pulse 99.

Sequential areas of magnetic media 100 are encoded with alternating and opposing magnetic fields. The transition from one field to another results from a transition of combined signal 98. Write equalization pulses 99 are timed at a frequency too high for magnetic media 100 to respond. As a result, write equalization pulses 99 serve to erase a corresponding area 102 of magnetic media 100.

When a magneto-resistive head is used to read magnetic media 100, a read signal 104 is generated that includes a series of pulses 106–112 each representing a transition from one magnetic field to another as detected by the head. Erased area 102 serves as a pause between transitions and prevents pulse 106 from growing too large. As a result, the height "H" and width "W" of the read signal pulses are not allowed to saturate the magneto resistive head, maintaining linearity and allowing the read signal to be more easily translated into a form corresponding to write data 82.

PATTERN DEPENDENCE: Summarizing the prior section, where a stream of write data includes a sparse data pattern, a write equalization signal is combined with a corresponding write signal. The write equalization signal includes one or more higher frequency pulses to help properly shape a resulting read signal. Instead of simply turning write equalization on or off based on a predetermined level of sparseness, the write equalization pulses can be timed and shaped based on detected levels of sparseness. For example, a first level of sparseness for a data pattern may be the occurrence of a single non-transition bit. A second level may be the occurrence of two consecutive non-transition bits. Three consecutive non-transition bits may be at a third level, and so on.

FIG. 7 illustrates examples of variably shaped write equalization pulses. FIG. 8 illustrates examples of variably shaped and timed write equalization pulses. FIGS. 9 and 10 are flow diagrams illustrating method steps for implementing various embodiments. Starting with FIG. 7, a write clock signal is referenced as 114. Write equalization clock signal is referenced as 116 and has a period T. Each pulse of write clock signal 114 has a width 5 T. Signals 118–124 illustrate variously shaped write equalization pulses. Restated, signals 118–124 have varying duty cycles. The duty cycle of each may, for example, be selected after identifying a sparse data pattern in a write data stream. The particular duty cycle selected in a give case depends on the level of sparseness of the particular data pattern.

The equalization pulses of signals 118–124 each have a period of 5T equal to the pulse width of write clock 114 and are timed to coincide with the pulses of write clock 114. In other words, the rising edge of each equalization pulse in signals 118–124 coincides with a rising or falling edge of write clock signal 114. Signal 118 has a duty cycle of 1.5T/5T. Signal 120 has a duty cycle of 2T/5T. Signal 122 has a duty cycle of 2.5T/5T, and signal 124 has a duty cycle of 3T/5T.

The duty cycle of each signal in FIG. 7 may correspond to a particular level of sparseness. As an example, for a sparse data pattern having a single non-transition bit, write equalization pulses of signal 118 may be defined. For a sparse data pattern having two consecutive non-transition bits, write equalization pulses of signal 120 may be defined. For a sparse data pattern having three consecutive non-transition bits, write equalization pulses of signal 122 may be defined and for a sparse data pattern having four or more consecutive non-transition bits, write equalization pulses of signal 120 may be defined.

The particular timing and duty cycles illustrated in FIG. 7 and the possible basis for the selection of each are shown for example only. There may be fewer or more possible selections of any suitable duty cycle. FIG. 7 is provided only to help illustrate that a shape (duty cycle) of a write equalization pulse can be defined based on a trait (level of sparseness) of a data pattern.

Moving to FIG. 8, a write clock signal is referenced as 126. Write equalization clock signal 128 has a period T. Each pulse of write clock signal 126 has a width 5T. Signals 130–136 illustrate variously shaped and timed write equalization pulses. The duty cycle and pulse timing of each may, for example, be selected after identifying a sparse data pattern in a write data stream. The particular duty cycle and pulse timing selected in a given case depends on the level of sparseness of the particular data pattern.

The equalization pulses of signals 130–136 each have a period varying from 4.5T to 6T. The equalization pulse of signal 130 has a duty cycle of 2T/5T and is timed to so that its falling edge coincides with a falling edge of write clock signal 126. The equalization pulse of signal 132 has a duty cycle of 3T/6T and is also timed to so that its falling edge coincides with a falling edge of write clock signal 126. However the rising edge of the equalization pulse of signal 132 is timed to occur 1T earlier than that of the equalization pulse of signal 130. The equalization pulse of signal 134 has a duty cycle of 2T/4.5T and is also timed to so that its falling edge coincides with a falling edge of write clock signal 126. However the equalization pulse of signal 134 is timed to conclude 0.5T sooner than the equalization pulses of signals 130 and 132. The equalization pulse of signal 136 has a duty cycle of 3T/5T and is timed to so that its rising edge coincides with the rising edges of the equalization pulses of signals 130 and 134. However the falling edge of the equalization pulse of signal 136 occurs 1T after the falling edges of the write equalization pulses of signals 130–134.

The pulse timing and duty cycle of each signal in FIG. 8 may correspond to a particular level of sparseness. As an example, for a sparse data pattern having a single non-transition bit, the equalization pulse of signal 130 may be defined. For a sparse data pattern having two consecutive non-transition bits, signal 132 may be defined. For a sparse data pattern having three consecutive non-transition bits, the equalization pulse of signal 134 may be defined and for a sparse data pattern having four or more consecutive non-transition bits, the equalization pulse of signal 136 may be defined.

The particular timing and duty cycles illustrated in FIG. 8 and the possible basis for the selection of each are shown for example only. There may be fewer or more possible available selections. FIG. 8 is provided only to help illustrate that a pulse shape (duty cycle) of a write equalization signal and the pulse timing can be selected based on a trait (level of sparseness) of a sparse data pattern.

FIG. 9 is an exemplary flow diagram illustrating method steps for writing to magnetic media using a write equalization signal defined according to a trait of a data pattern to be written. Initially, a stream of write data is received and sampled (step 138). A write signal is generated for the sampled write data (step 140). Concurrently, a pattern in the sampled write data is identified (step 142). For example, a sparse data pattern may be identified. A write equalization pulse or pulses are then defined based on traits of the pattern (step 144). Such traits may, for example, include a level of sparseness, that is, the number of consecutive non-transition bits. The level of sparseness can be identified directly by sampling the write data itself or indirectly by sampling the write signal and identifying a duration of non-transition where the extent of the duration corresponds to the number of consecutive non-transition bits. A write equalization signal with the defined pulses is multiplexed with the write signal (step 146). The combined signal is then written to the magnetic media (step 148).

Referring back to FIG. 5 as an example, step 138 can involve receiving the write data into data buffer 30 to be sampled by write signal engine 32 and equalization engine 76. Steps 140 and 142/144 can be performed by write signal engine 32 and equalization engine 76 respectively. Multiplexer 80 combines the write signal and the write equalization signal in step 146 while write head 18 encodes the magnetic media in step 148 and the process repeats.

FIG. 10 is another exemplary flow diagram illustrating method steps for defining characteristics of equalization pulses. Such characteristics can include timing and pulse shape or duty cycle. Write data is sampled (step 150), and a data pattern is identified (step 152). It is then determined if the data pattern is sparse or dense (step 154). For example a sparse data patterns may be defined as the occurrence of one or more consecutive non-transition bits. A dense data pattern may be defined as the absence of a consecutive series of a selected number (0, 1, 2, etc.) of non-transition bits. If determined to be sparse, a level of sparseness is then determined (step 156). The level of sparseness may be determined by identifying the number of consecutive non-transition bits. This may be done directly by sampling the write data itself or indirectly by sampling the write signal as described earlier. A write equalization pulse or pulses are then defined based on the identified level (step 158). Those pulses can then be added to a write signal generated for the identified pattern. The process repeats with step 150.

If, in step 154, it is determined that the pattern identified in step 152 is not sparse, write equalization is disabled for that pattern (step 160). In other words, no write equalization pulses are to be added to the write signal generated for the identified pattern. The process repeats with step 150.

Figure 5:
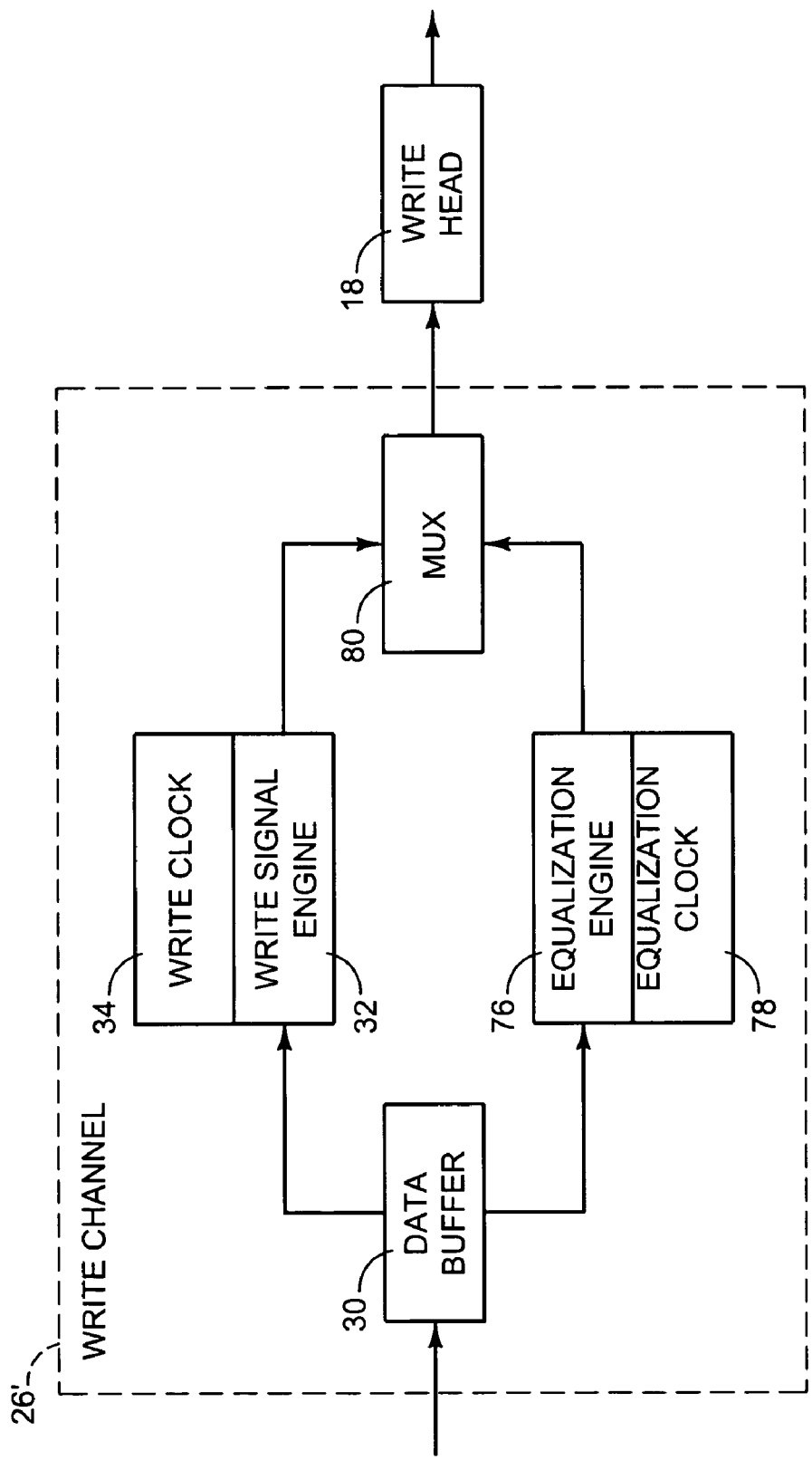
FIG. 5 is a block diagram of another implementation of a write channel.

CONCLUSION: The schematic diagram of FIG. 1 illustrates an exemplary magnetic media drive in which embodiments may be implemented. Implementation, however, is not limited to the media drive shown. The block diagram of FIG. 5 shows the architecture, functionality, and operation of an embodiment of the present invention. A number of the blocks are defined in part as programs. Each of those blocks may represent in whole or in part a module, segment, or portion of code that comprises one or more executable instructions to implement the specified logical function(s). Each block may also represent a circuit or a number of interconnected circuits to implement the specified logical function(s).

Also, the present invention can be embodied at least in part, in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 9 and 10 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A pattern dependent write equalization method, comprising:
providing different levels of sparseness to distinguish data patterns in write data;
identifying a trait of a data pattern in a stream of write data;
identifying the trait with one of the different levels of sparseness to identify the data pattern in the stream; and
generating a write equalization signal having a characteristic defined according to the one of the different levels of sparseness for the data pattern.

2. The method of claim 1, wherein:
identifying a trait of a data pattern in a stream of write data comprises identifying a trait of a write signal corresponding to the data pattern; and
generating comprises generating a write equalization signal having a characteristic defined according to the identified trait of the write signal.

3. The method of claim 1, wherein
identifying a trait of a write signal corresponding to the data pattern comprises identifying a spacing of one or more write signal pulses; and
generating comprises generating a write equalization signal having a characteristic defined according to the identified spacing of the one or more write signal pulses.

4. The method of claim 1, wherein generating comprises generating a write equalization signal that includes one or more write equalization pulses having a shape defined according to the identified trait.

5. The method of claim 1, wherein generating comprises generating a write equalization signal that includes one or more write equalization pulses having a shape and timing defined according to the identified trait.

6. The method of claim 1, wherein:
identifying comprises identifying a trait in the form of a number of consecutive non-transition bits in the write data; and
generating comprises generating a write equalization signal having a characteristic defined according to the number.

7. The method of claim 1, wherein the trait of the data pattern is a number of consecutive non-transition bits and wherein:
identifying comprises identifying the trait in the form of a duration of non-transition in a write signal, the duration corresponding to the number of consecutive non-transition bits, and
generating comprises generating a write equalization signal having a characteristic defined according to the duration.

8. The method of claim 1, further comprising combining the write equalization signal with a write signal for the write data stream and utilizing the combined signal to encode a representation of the write data on a magnetic medium.

9. A pattern dependent write equalization method, comprising:
providing different levels of sparseness to distinguish data patterns in write data;
identifying a first level of sparseness with a first trait of a first data pattern in a stream of write data;
identifying a second level of sparseness with a second trait of a second data pattern in a stream of write data;
generating a write equalization signal having a first characteristic defined according to the first level of sparseness for the first data pattern; and
generating a write equalization signal having a second characteristic defined according to the second level of sparseness for the second data pattern.

10. The method of claim 9, wherein generating comprises generating a write equalization signal that includes one or more write equalization pulses having a first shape defined according to the identified first trait, and one or more write equalization pulses having a second shape defined according to the identified second trait.

11. A computer readable medium having computer executable instructions for:
providing different levels of sparseness to distinguish data patterns in write data;
identifying a trait of a data pattern in a stream of write data;
identifying the trait with one of the different levels of sparseness to identify the data pattern in the stream; and
generating a write equalization signal having a characteristic defined according to the one of the different levels of sparseness for the data pattern.

12. The medium of claim 11, wherein:
the instructions for identifying a trait of a data pattern in a stream of write data include instructions for identifying a trait of a write signal corresponding to the data pattern; and
the instructions for generating include instructions for generating a write equalization signal having a characteristic defined according to the identified trait of the write signal.

13. The medium of claim 11, wherein
the instructions for identifying a trait of a write signal corresponding to the data pattern include instructions for identifying a spacing of one or more write signal pulses; and
the instructions for generating include instructions for generating a write equalization signal having a characteristic defined according to the identified spacing of the one or more write signal pulses.

14. The medium of claim 11, wherein the instructions for generating include instructions for generating a write equalization signal that includes one or more write equalization pulses having a shape defined according to the identified trait.

15. The medium of claim 11, wherein the instructions for generating include instructions for generating a write equalization signal that includes one or more write equalization pulses having a shape and timing defined according to the identified trait.

16. The medium of claim 11, wherein:
the instructions for identifying include instructions for identifying a trait in the form of a number of consecutive non-transition bits in the write data; and
the instructions for generating include instructions for generating a write equalization signal having a characteristic defined according to the number.

17. The medium of claim 11, wherein the trait of the data pattern is a number of consecutive non-transition bits and wherein:
the instruction for identifying include instructions for identifying the trait in the form of a duration of non-transition in a write signal, the duration corresponding to the number of consecutive non-transition bits, and
the instructions for generating include instructions for generating a write equalization signal having a characteristic defined according to the duration.

18. The medium of claim 11, farther comprising instructions for combining the write equalization signal with a write signal for the write data stream and utilizing the combined signal to encode a representation of the write data on a magnetic medium.

19. A computer readable medium having computer executable instructions for:
providing different levels of sparseness to distinguish data patterns in write data;
identifying a first level of sparseness with a first trait of a first data pattern in a stream of write data;
identifying a second level of sparseness with a second trait of a second data pattern in a stream of write data;
generating a write equalization signal having a first characteristic defined according to the first level of sparseness for the first data pattern; and
generating a write equalization signal having a second characteristic defined according to the second level of sparseness for the second data pattern.

20. The medium of claim 19, wherein the instructions for generating include instructions for generating a write equalization signal that includes one or more write equalization pulses having a first shape defined according to the identified first trait, and one or more write equalization pulses having a second shape defined according to the identified second trait.

21. A write channel for a magnetic storage device having a write head, the write channel comprising:
a write signal engine operable to generate a write signal corresponding to a stream of write data;
an equalization engine operable to identify a trait of a data pattern in the stream of write data, associate the trait with one of plural different levels of sparseness, and to generate an equalization signal having a characteristic defined according to the one of the plural different levels of sparseness for the data pattern; and
a multiplexer operable to combine the write equalization signal with the write signal, the combined signal to be used by the write head to encode the write data on a magnetic medium, wherein the equalization engine generates a write signal having a characteristic defined according to the one of the plural different levels of sparseness.

22. The write channel of claim 21, wherein the equalization engine is operable to identify a trait of a data pattern in the stream of write data comprises by identifying a trait of a pulse in the write signal corresponding to the data pattern and to generate a write signal having a characteristic defined according to the identified trait of the pulse.

23. The write channel of claim 21, wherein the equalization engine is operable to generate a write equalization signal having one or more write equalization pulses shaped according to the identified trait.

24. The write channel of claim 21, wherein the equalization engine is operable to generate a write equalization signal having one or more write equalization pulses shaped and timed according to the identified trait.

25. The write channel of claim 21, wherein the equalization engine is operable to identify the pattern in the form of a number of consecutive non-transition bits in the write data and to generate a write signal having a characteristic defined according to the number.

26. The write channel of claim 21, wherein the trait of the data pattern is the number of consecutive non-transition bits and wherein the equalization engine is operable to identify the trait in the form of a duration of non-transition in the write signal and to generate a write signal having a characteristic defined according to the duration.

27. A magnetic media drive, comprising:
a write channel comprising a write signal engine operable to generate a write signal corresponding to a stream of write data, an equalization engine operable to identify a trait of a data pattern in the stream of write data, associate the trait with one of plural different levels of sparseness, and to generate a write equalization signal having a characteristic defined according to the one of the plural different levels of sparseness for the data pattern, and a multiplexer operable to combine the write equalization signal with the write signal;
a tape take-up reel;
a write head in communication with the write channel and positionable adjacent to a tape path extending past the write head to the take-up reel, the write head operable to utilize the combined signal from the write channel to encode the write data on a magnetic medium traveling along the tape path; and
an electronic controller configured to receive write instructions and the write data from a computer or other host device and to control operation of the take-up reel, the write head, and the write channel.

* * * * *

UNITED STATES PATENT AND TRADEMARK OFFICE
CERTIFICATE OF CORRECTION

| | |
|---|---|
| PATENT NO. | : 7,251,090 B2 |
| APPLICATION NO. | : 11/106177 |
| DATED | : July 31, 2007 |
| INVENTOR(S) | : Steven L Brittenham |

It is certified that error appears in the above-identified patent and that said Letters Patent is hereby corrected as shown below:

In column 11, line 36, in Claim 18, delete "farther" and insert -- further --, therefor.

Signed and Sealed this
Sixth Day of December, 2011

David J. Kappos
*Director of the United States Patent and Trademark Office*